United States Patent [19]
Armstrong et al.

[11] 3,949,707
[45] Apr. 13, 1976

[54] LIVESTOCK WATERING SYSTEM

[75] Inventors: William R. Armstrong; Gerald L. Kounkel, both of Eldora, Iowa

[73] Assignee: Confinement Livestock Systems, Inc., Eldora, Iowa

[22] Filed: Oct. 23, 1974

[21] Appl. No.: 517,433

[52] U.S. Cl. ................................ 119/73; 119/75
[51] Int. Cl.[2] ........................................ A01K 7/00
[58] Field of Search ....................... 119/73, 75, 72.5

[56] References Cited
UNITED STATES PATENTS

| | | | |
|---|---|---|---|
| 1,977,346 | 10/1934 | Moorman | 119/73 |
| 3,049,094 | 8/1962 | Smith | 119/75 |

*Primary Examiner*—Hugh R. Chamblee
*Attorney, Agent, or Firm*—Zarley, McKee, Thomte & Voorhees

[57] ABSTRACT

A livestock watering system comprising an underground water storage tank having a pump means connected thereto for pumping water therefrom. A first water line extends from the pump to a vertically disposed riser pipe positioned in the ground and extending upwardly to ground level. A waterer housing is positioned over the upper end of the riser pipe and has an interior compartment formed therein which communicates with the upper end of the riser pipe. A second water line is connected to the first line and extends upwardly through the riser pipe and into the interior compartment of the housing. A nipple water valve means is connected to the upper end of the second water line and has nipple valve members extending outwardly through the housing to permit the livestock to obtain water. A third water line is connected to the valve means and extends downwardly through the interior compartment and the riser pipe. A fourth water line extends from the lower end of the third water line either to a return line to the water tank or to another waterer housing. A pipe means extends between the lower ends of the second and third water lines and has a restriction formed therein so that a predetermined amount of water passes upwardly into the second water line and so that a predetermined amount of water bypasses the second water line. The riser pipe and the interior compartment of the housing have cross-sectional areas sufficiently large so that heat from the ground may rise upwardly through the riser pipe and into the interior compartment so that the water in the valve means will not freeze. Most heat energy is in the circulating water itself.

6 Claims, 6 Drawing Figures

U.S. Patent   April 13, 1976   3,949,707
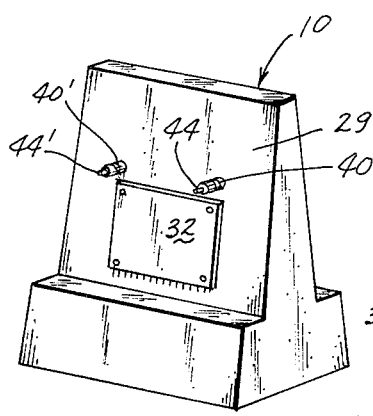
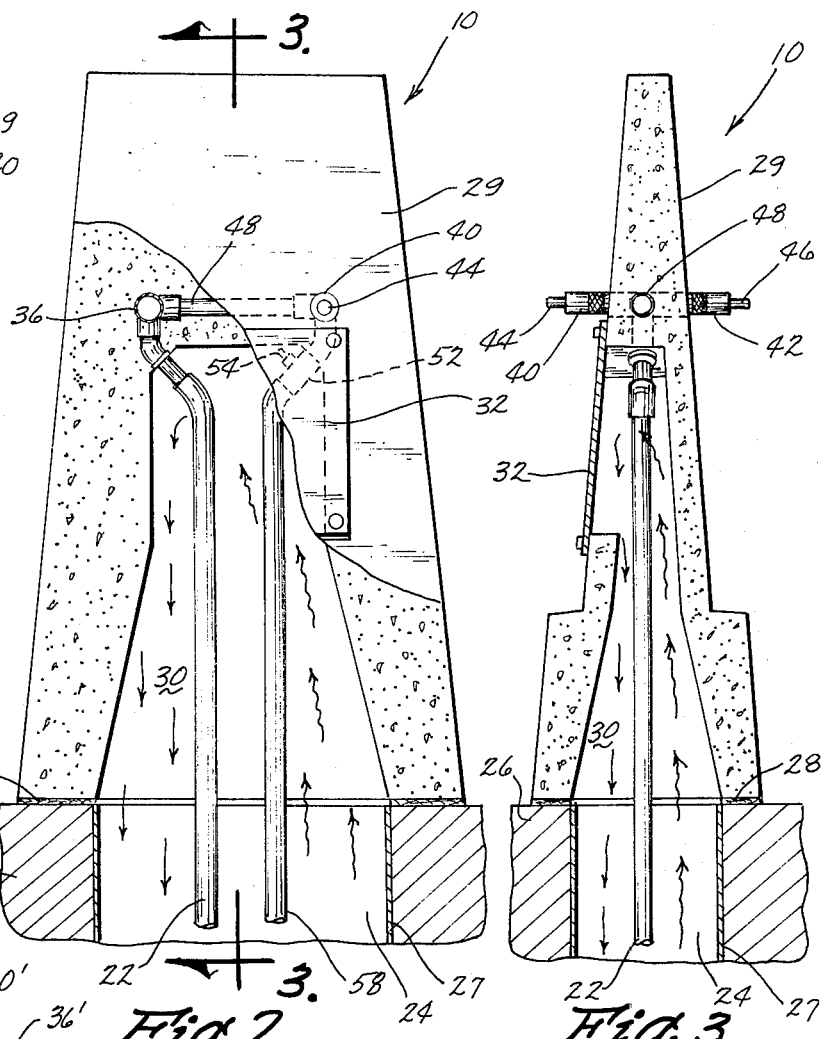
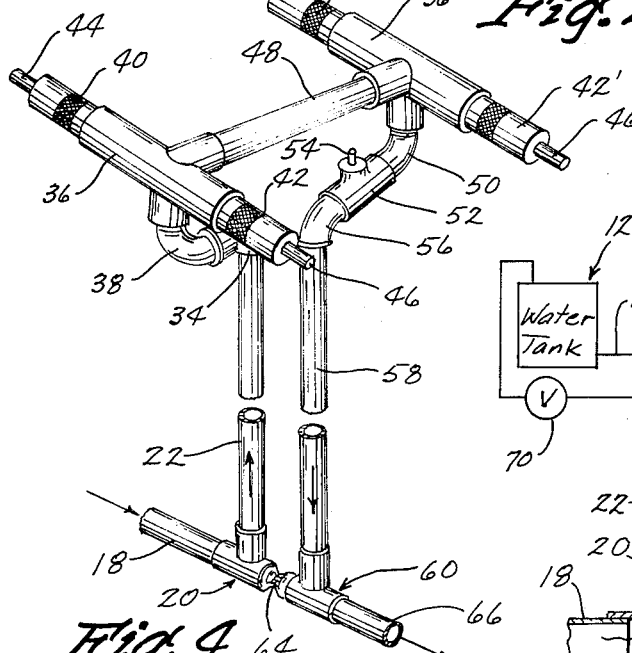
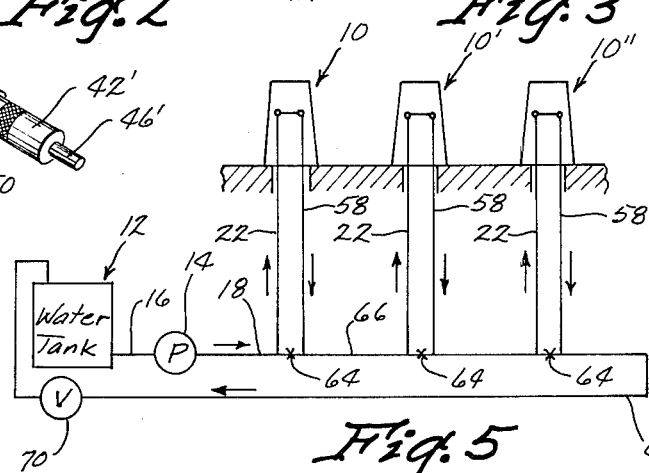
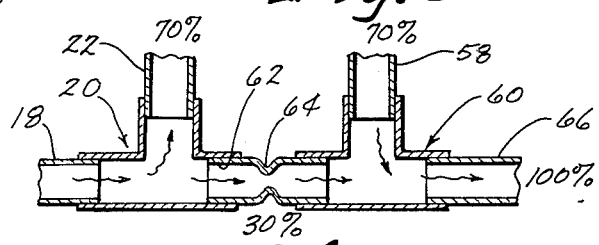
Fig. 1
Fig. 2
Fig. 3
Fig. 4
Fig. 5
Fig. 6

LIVESTOCK WATERING SYSTEM

BACKGROUND OF THE INVENTION

This invention relates to a livestock watering system and more particularly to a livestock watering system having means associated therewith for preventing the water from freezing.

It is desirable to have some means for watering livestock other than the conventional open tanks which are subject to contamination and freezing. Several waterer systems have been provided but difficulty has been experienced in preventing the water therein from freezing.

Therefore, it is a principal object of the invention to provide an improved livestock watering system.

A further object of the invention is to provide a livestock watering system wherein means is provided for allowing the heat from the ground and the circulating water to prevent the water from freezing.

A further object of the invention is to provide a livestock watering system including means therein for preventing the water in the system from freezing.

A further object of the invention is to provide a livestock watering system which is economical to manufacture, durable in use and refined in appearance.

These and other objects will be apparent to those skilled in the art.

BRIEF DESCRIPTION OF THE DRAWINGS

This invention consists in the construction, arrangements and combination of the various parts of the device, whereby the objects contemplated are attained as hereinafter more fully set forth, specifically pointed out in the claims, and illustrated in the accompanying drawings, in which:

FIG. 1 is a perspective view of the waterer housing:

FIG. 2 is a sectional view of the housing and the upper portion of the riser pipe:

FIG. 3 is a sectional view seen on lines 3—3 of FIG. 2:

FIG. 4 is a perspective view of the valve means and associated piping:

FIG. 5 is a schematic view of the system; and

FIG. 6 is a sectional view illustrating the restriction in the pipe means at the lower end of the riser pipe.

DESCRIPTION OF THE PREFERRED EMBODIMENT

The numeral 10 refers generally to the waterer of this invention which is adapted for use as a single unit or as a plurality of units connected in "series" as seen in FIG. 5. As seen in FIG. 5, the numeral 10' refers to a second waterer while the numeral 10'' refers to a third waterer which is used as illustrated.

The numeral 12 refers to an underground storage tank for storing water which is located approximately 4 to 8 feet below the ground to prevent the water therein from freezing. Ordinarily, the temperature of the water will remain at approximately 40°–50°F regardless of the surface temperature. Tank 12 is connected to a circulating pump 14 by a water line 16. Water line 18 extends from pump 14 to a Tee 20. Tee 20 is in communication with a water line or pipe 22 which extends upwardly therefrom through a passageway 24 formed in the ground 26. Passageway 24 may be suitably cased by a riser pipe 27.

The housing 29 of waterer 10 is preferably comprised of a concrete material and is secured to the upper portion of the supporting surface by an adhesive 28 so as to provide a water tight seal between the water or housing and the riser pipe 27. Waterer 10 is provided with a central cavity or internal compartment 30 through which extends the pipe 22 as illustrated in FIG. 2. Housing 29 is provided with a panel or cover 32 secured to one side thereof to permit access to the upper portion of the compartment 30 as illustrated in FIG. 3.

Pipe elbow 34 is secured to the upper end of pipe 22 and is connected to a side entrance Tee 36 by means of pipe 38. Nipple valves 40 and 42 are threadably mounted in the opposite ends of the Tee 36 and have nipple elements 44 and 46 extending therefrom which are adapted to dispense water upon depression thereof. Tee 36 is connected to a Tee 36' by a nipple or pipe 48. Nipple valves 40' and 42' are mounted in the opposite ends of the Tee 36' and have nipple elements 44' and 46' extending from the ends thereof. A 45° pipe elbow 50 is connected to the Tee element 36' and has a Tee 52 connected thereto which is provided with an air relief valve 54. Elbow 56 is connected to the Tee 52 and has a pipe 58 extending downwardly therefrom. The lower end of the pipe 58 is connected to the Tee 60. Pipe nipple 62 is secured to and extends between the Tees 20 and 60 as seen in FIG. 6. Nipple 62 is provided with a restriction therein referred to generally by the reference numeral 64. The numeral 66 refers to a water line which extends from the Tee 60 to the next waterer as seen in FIG. 5. In FIG. 5, the numeral 68 refers to a return line which extends from the last waterer in the system to the water tank 12.

In operation, the water in the storage tank 12 is circulated by the circulating pump 14 through the line 18 until it reaches Tee 20. Restriction 64 in nipple 62 allows approximately 70 per cent of the water to go upwardly through the pipe 22 and permits approximately 30 per cent of the water to pass therethrough to the Tee 60 and pipe 66. In other words, the restriction 64 permits 30 per cent of the water to pass therethrough while causing approximately 70 per cent of the water to go upwardly through the pipe 22. The water moves upwardly through the pipe 22 and is supplied to the Tee 36. If the nipple valves 40 or 42 are not opened by the animal, all of the water supplied to the Tee 36 will pass through the pipe 48 to the Tee 36'. If neither of the nipple valves 40' and 42' are actuated by the animal, all of the water supplied thereto will pass downwardly therefrom through the pipe 58 so as to be furnished to the Tee 60 and thus to the pipe 66. The water returning to the Tee 60 by means of the pipe 58 joins the water passing through the restriction 64 so that 100 per cent of the water is then furnished to the next waterer providing none of the nipple valves are being opened. The restriction 64 permits the water to drain back to the tank 12 if a power failure should occur. The restriction 64 also causes the water flowing downwardly from the waterer 10 to mix with the water which has remained below ground so that the water which has circulated through the waterer will pick up heat from the water to prevent subsequent freezing thereof. The process of passing the water through the Tees and pumping the same upwardly through the waterers can occur as many times as the installation can warrant providing adequate pump capacity is present. After the water has been furnished to the last waterer, the water is returned to the tank 12 by means of the return line 68. The numeral 70 refers to a valve imposed in the return line 68 so that back pressure is supplied to the last waterer and so that the flow rate may be controlled.

The riser pipe 27 provides an access for the lines running from beneath the ground upwardly to the waterer and also serves the purpose of providing warm air into the interior compartment 30 of the housing 29. The fact that the housing is sealed to the surface or to the upper end of the pipe 27 prevents foreign material from falling downwardly into the riser pipe 27 and prevents heat loss from the riser pipe 27. The underground temperature of the soil is greater than the housing 29 so that convection currents will occur within the riser pipe 27. In other words, the warm air will rise from the riser pipe 27 into the compartment 30 of the housing 29. The air in the compartment 30 will be cooled by the housing being exposed to the atmosphere which will cause the air to become more dense and to move downwardly into the riser pipe 27. In other words, the circulation of the air within riser pipe 27 and the compartment 30 along with the heat energy in the circulating water will serve to maintain the air temperature within compartment 30 at a temperature sufficient to prevent freezing of the water within the lines and the nipple valves. The air relief valve 52 is provided to allow air to enter the system if the pump should stop pumping. If the pump were to stop pumping, there is a possibility that the water lines would not drain back to the tank 12 which would cause the water in the system to freeze. By allowing air to enter the system, the system can completely drain to an underground level where it will not freeze.

Thus it can be seen that a novel waterer has been provided together with means for preventing the water therein from freezing. Thus it can be seen that the invention accomplishes at least all of its stated objectives.

We claim:

1. A livestock watering system comprising,
    a concrete waterer housing having a lower end and an upper end, said housing having formed therein a hollow compartment with an open end at said lower end of said housing;
    a pipe circuit having a portion thereof embedded in said housing, said pipe circuit having first and second terminal ends extending within said compartment and an animal water outlet extending exteriorly of said housing at a point spaced above the ground;
    said outlet having a valve therein which is movable between open and closed positions and which is biased towards its closed position, said valve being yieldably movable to its open position in response to pressure from the livestock being watered.
    a source of water above freezing temperature;
    a first pipe connected to said source and extending from below the frost line of the ground upwardly into said compartment where it is connected to said first terminal end of said pipe circuit,
    a second pipe connected to said second terminal end and extending downwardly therefrom below the frost line of the ground;
    vertical underground pipe housing means in communication with said open end of said compartment and extending downwardly below the frost line of the ground; said housing means surrounding said first and second pipes;
    pump means for providing continuous flow of water from said source through said first pipe, said pipe circuit, and said second pipe whereby heat energy in said circulating water will deter freezing of water in said water lines.

2. The system of claim 1 wherein said passageway and said interior compartment have horizontal cross-sectional areas sufficiently large so that heat from the ground will rise upwardly into said interior compartment to help prevent freezing of the water in said valve means.

3. The device of claim 1 wherein said water outlets are nipple valve elements.

4. The device of claim 1 wherein said housing has an access opening in the side thereof for communication with said compartment to permit access to said terminal ends.

5. The device of claim 1 wherein said housing includes a step element on its sides to support the front feet of an animal to permit easy access by the animal to said water outlet.

6. The system of claim 1 wherein a third pipe interconnects said first and second pipes below the frost level of the ground for permitting water to pass directly from said first pipe to said second pipe without passing through said pipe circuit in said waterer housing; said third pipe having a restriction therein which limits the amount of water passing therethrough so that part of the water from said first pipe passes through said pipe circuit and part of the water from said first pipe by-passes said pipe circuit.

* * * * *